Dec. 30, 1924.
N. W. FRANK
CUT-OUT
Filed June 7, 1922
1,521,176
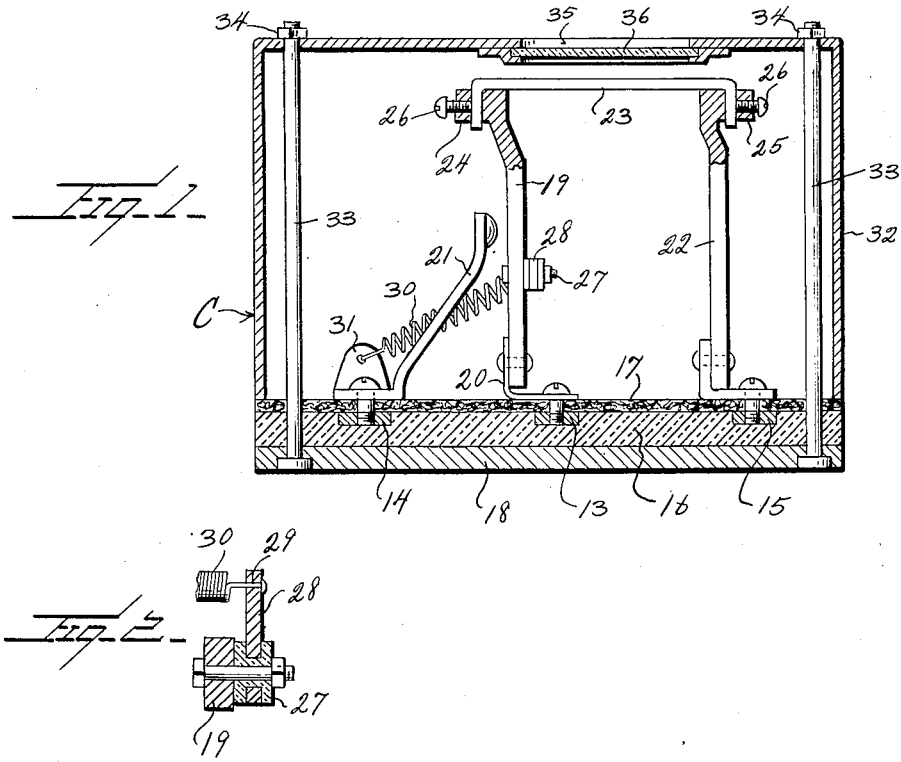
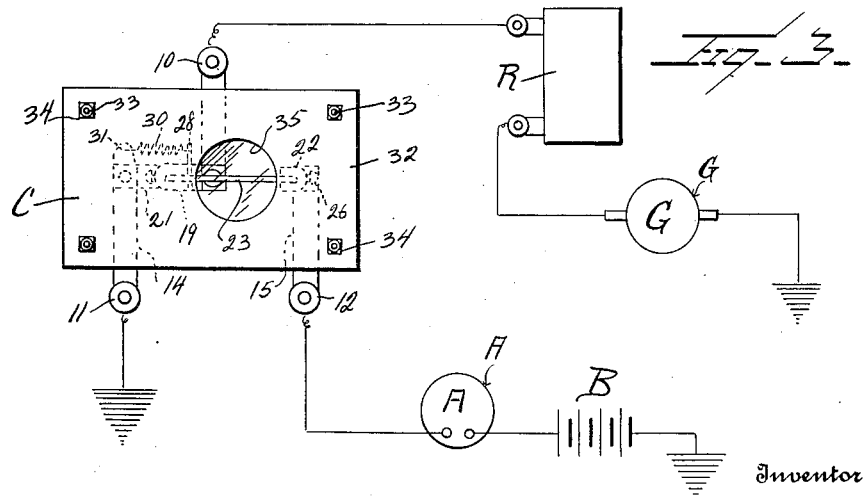
Inventor
N. W. Frank
By Watson E. Coleman
Attorney Patented Dec. 30, 1924.

1,521,176

UNITED STATES PATENT OFFICE.

NEAL W. FRANK, OF VINITA, OKLAHOMA, ASSIGNOR OF ONE-THIRD TO THOMAS C. COLLINS AND ONE-THIRD TO T. D. COX, BOTH OF VINITA, OKLAHOMA.

CUT-OUT.

Application filed June 7, 1922. Serial No. 566,502.

*To all whom it may concern:*

Be it known that I, NEAL W. FRANK, a citizen of the United States, residing at Vinita, in the county of Craig and State of Oklahoma, have invented certain new and useful Improvements in Cut-Outs, of which the following is a specification, reference being had to the accompanying drawings.

This invention relates to cut-outs, and more particularly to a device for automatically grounding a generator to prevent burning out thereof in event of sticking of the ordinary regulator cut-out employed in the circuit.

In many cars employing a storage battery and a generator for charging the storage battery, a regulator is provided which is employed for automatically cutting out the generator at predetermined engine speeds so that the overload created by the increased speed of the generator will not result in burning out the generator. Often these regulators, which are magnetically actuated, will stick and not operate at the proper time allowing the generator to become overheated and burn out. An important object of this invention is to provide a device connectible in circuit with the generator and its regulator for grounding the current from the generator upon failure of the regulator to operate.

A further object of the invention is to provide a device of this character which is extremely simple in its construction and arrangement and which may be readily applied to the circuits of the generators now in use upon automobiles without in any manner altering the circuit.

A still further object of the invention is to provide a device of this character which in grounding the generator does not interfere with the operation of the battery and accordingly permits the use of the battery for the lighting and ignition of the vehicle.

These and other objects I accomplish by the construction and arrangement shown in the accompanying drawings wherein for the purpose of illustration is shown a preferred embodiment of my invention and wherein like reference characters designate like parts throughout.

In the drawings:

Figure 1 is a sectional view taken through a cut-out constructed in accordance with my invention;

Figure 2 is a detail view showing the mounting of the insulated arm of the movable contact member; and Figure 3 is a diagrammatic view showing the manner of connecting the cut-out in circuit.

Referring now more particularly to the drawings, in Figure 3 of which I have shown a wiring diagram of a well known type of car, G represents the generator, R the regulator of the generator, A the ammeter and B the battery. In the ordinary wiring circuit the generator G, regulator R, ammeter A and battery B are arranged in series in the order named. In accordance with my invention the cut-out C is connected intermediate the regulator R and ammeter A so that the generator, regulator, cut-out, ammeter and battery are arranged in series under normal conditions. However, as hereinafter will appear, upon an undue overload of this series circuit, the cut-out will operate to place the generator G in series with the regulator and cut-out, eliminating the ammeter and battery from the series.

The cut-out C comprises three binding posts, 10, 11 and 12, which are connected to bars 13, 14 and 15 respectively embedded in some insulatory substance such as a battery compound 16. Upon the outer face of this battery compound is arranged a layer of fiber 17 and upon the lower face thereof a suitable base of any desired material, as indicated at 18. The bar 13 is connected with a pivotal, vertically disposed conductor member 19 superposed upon the fiber sheet 17 and pivotally connected therewith in any desired manner. In the present instance this pivotal connection is shown as consisting of a pliable sheet of copper 20. The bar 14 is connected with a stationary contact member 21 and the bar 15 with a second stationary contact member 22.

To the contact member 22 the pivotal contact member 19 is connected by means of a fuse wire 23. In the present instance the upper ends of the contact members 19 and 22 are shown as provided with sleeves 24 and 25 respectively, adapted to receive the ends of the fuse wire 23 and provided with set screws 26 by means of which the ends of the wire may be clamped in the sleeves.

The fuse wire 23, as will hereinafter appear, maintains the pivotal contact member 19 out of engagement with the contact member 21. Secured to and insulated from the upper end of the pivotal contact member 19, as at 27, is an arm 28, the end of which is provided with an aperture 29 receiving one end of a spring 30. The opposite end of this spring 30 is suitably secured to some fixed point as, for example, an attaching plate 31 formed integrally with the contact member 21. This spring urges the pivotal contact member 19 into engagement with the contact member 21, movement of the contact member 19 being restrained by the fuse wire 23.

In connecting my device in the circuit of an automobile, the wire leading from the ammeter to the regulator is removed from the regulator and fastened to the binding post 12 of the cut-out C. The binding post 10 of the cut-out is then connected by the wire with the binding post of the regulator R and the binding post 11 of the cut-out is connected with the ground of the car, usually the engine or frame of the car. During normal operation of the generator and during proper operation of the regulator thereof, the current will now pass from the generator, through the regulator, binding post 10, bar 13, pliable plate 20, contact 19, fuse wire 23, contact 22, bar 15, binding post 12 to the ammeter and thence through the battery to the ground where it returns to the generator. If, however, during an overload of the generator the regulator R fails to operate to cut down the strength of the current passing from the generator to the battery, the fuse wire 23 will burn out and the contact 19 will be moved by the spring 30 into engagement with the contact 21. Current now passes from the generator through regulator R, binding post 10, through the bar 13, pliable plate 20, contact 19, contact 21, bar 14 and binding post 11 to the ground where it returns to the generator, the battery and ammeter being removed from the circuit. This operation will be indicated upon the dash of the vehicle by the fact that the ammeter A will show no reading whatever or a discharge reading depending upon the type of ammeter employed, indicating that an inspection of the regulator or of the wiring of the car is necessary. It will, of course, be understood that the size of fuse wire will be varied in proportion to the strength of the current normally employed in the vehicle to which the cut-out is applied. In order to protect the contacts from collection of dirt and grease tending to short circuit the same, I provide a housing 32 held in position upon the fiber sheet 17 by means of retaining bolts 33 having their ends seated in the base and extending upwardly therefrom, the ends of these bolts projecting through openings in the casing and having attaching nuts 34 secured thereto. Above the fuse wire 23 connecting the contacts 19 and 22 an opening 35 is provided in the housing 32 which is covered by a transparent element 36 affording a view of the fuse wire so that it will be unnecessary to remove the housing 32 to ascertain whether or no this wire has been burnt out.

In view of the foregoing it is believed to be obvious that a cut-out constructed in accordance with my invention when applied in the circuit of an automobile will prevent burning out of the generator thereof upon failure of the regulator. It will furthermore be obvious that the same may be very readily connected in the circuit and may be very cheaply produced. Many changes being possible in the shape, size and arrangement of the various parts of my regulator as hereinbefore described, I do not wish to be limited to the specific structure thereof except as hereinafter claimed.

I claim:—

A cut out for use in starting and lighting systems of automotive vehicles comprising an insulating base, a member rigidly secured to the base and extending upwardly therefrom, a second member pivoted to the base and extending upwardly therefrom and in spaced relation to the first named member, a third member extending upwardly from the base and rigid to the base and arranged at that side of the second member remote from the first named member, a spring connecting the second named member and the third named member and urging the second named member into engagement with the third member and a fusible link connecting the upper link of the first and second named members and maintaining the second named member separated from the third member.

In testimony whereof I hereunto affix my signature.

NEAL W. FRANK.